United States Patent
Shelton

Patent Number: 5,953,846
Date of Patent: Sep. 21, 1999

[54] FISHING ROD CONTROLLER

[76] Inventor: Billy R. Shelton, 5279 Salisbury Dr., Newark, Calif. 94560

[21] Appl. No.: 08/789,762

[22] Filed: Jan. 28, 1997

Related U.S. Application Data

[60] Provisional application No. 60/011,245, Feb. 6, 1996.

[51] Int. Cl.$^6$ .................................................. A01K 97/10
[52] U.S. Cl. ........................... 43/21.2; 224/200; 224/922
[58] Field of Search ........................ 43/21.2, 25; 224/200, 224/185, 922, 251; 248/514, 538; 211/70.8

[56] References Cited

U.S. PATENT DOCUMENTS

| | | | |
|---|---|---|---|
| 2,271,136 | 1/1942 | Geiger . | |
| 2,298,694 | 10/1942 | Haislip . | |
| 2,576,624 | 11/1951 | Miller . | |
| 2,781,958 | 2/1957 | Lewandowski | 224/251 |
| 3,874,573 | 4/1975 | Fruscella | 43/21.2 |
| 4,097,017 | 6/1978 | Hazlitt | 248/515 |
| 4,150,506 | 4/1979 | McGinnis et al. | 43/21.2 |
| 4,569,466 | 2/1986 | Webber | 224/253 |
| 4,587,757 | 5/1986 | Lirette | 43/21.2 |
| 4,739,914 | 4/1988 | Pothetes | 224/253 |
| 4,817,323 | 4/1989 | Braid | 43/21.2 |
| 4,828,152 | 5/1989 | Pepping | 43/21.2 |
| 4,858,364 | 8/1989 | Butts | 43/21.2 |
| 4,896,806 | 1/1990 | Sanchez, Jr. | 224/242 |
| 5,009,027 | 4/1991 | Lee | 43/21.2 |
| 5,044,109 | 9/1991 | Fast | 43/21.2 |
| 5,065,540 | 11/1991 | Potter, Jr. | 43/21.2 |
| 5,247,759 | 9/1993 | Noriega | 43/21.2 |
| 5,438,789 | 8/1995 | Emory | 43/21.2 |
| 5,571,228 | 11/1996 | McMurtrie | 43/21.2 |

FOREIGN PATENT DOCUMENTS

| | | | |
|---|---|---|---|
| WO85/02091 | 5/1985 | WIPO | 43/21.2 |

*Primary Examiner*—Jack W. Lavinder
*Attorney, Agent, or Firm*—Carol D. Titus; James J. Leary

[57] ABSTRACT

A fishing rod controlling device has four general sections: a leg pad, a curve section, a rod holder, and a belt. The fishing rod controller may be constructed by post-forming a section of plastic pipe. In the section of the controller that forms the leg pad, the pipe is split and spread apart far enough to allow the user's leg to rest within the curve. Above the leg pad and just below the curve, is a belt attachment. The controller is slit on both sides so belting material may be run through the slits. The belt is fit around the user's waist. Above the belt, the rod controller curves outward (away from the body of the user). The uppermost section of the rod controller is the rod holder. This section is a hollow cylindrical section of the pipe which is left unaltered in the basic version of the rod controller. It is within the cavity in the rod holder section that the rod is placed. A second embodiment of the rod controller has an adjustable attachment mechanism which attaches the rod holder section and the leg engagement section. The attachment also allows the user to exchange the rod holder for other types of holder sections. Alternate embodiments of the rod controller have extensions which allow the rod controller to be used for specialized rods and reels as well as being a support base for other devices such as rifles, guns, video cameras, photographic equipment, binoculars, spotting scopes, surveying equipment.

16 Claims, 10 Drawing Sheets

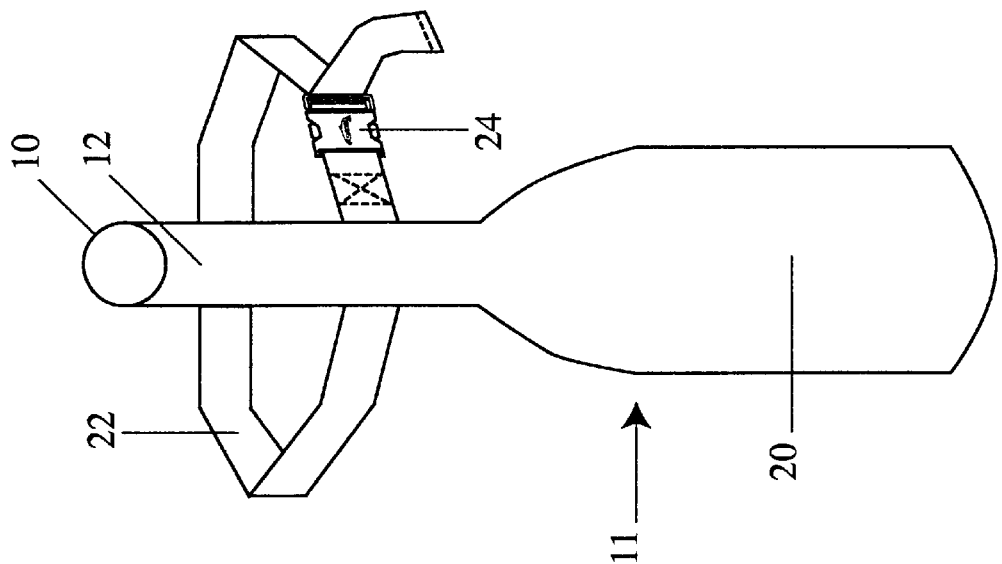
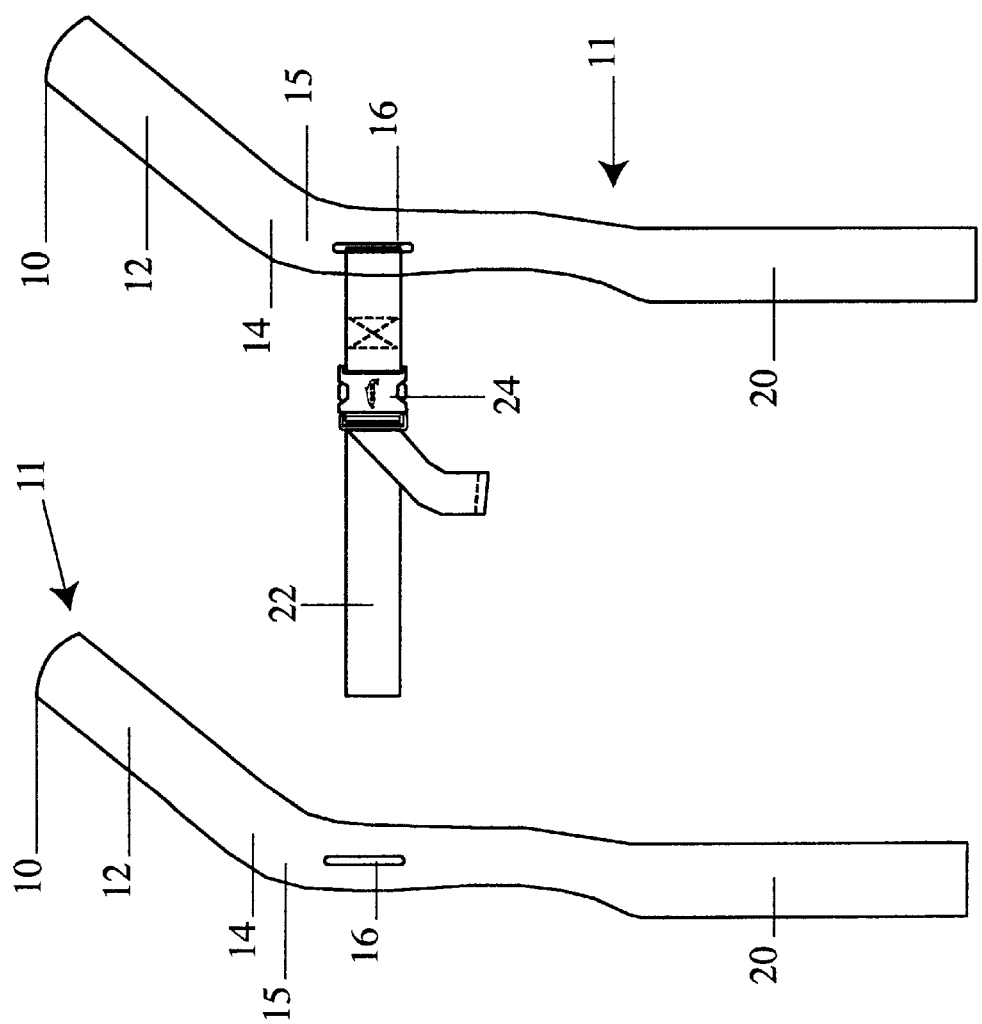

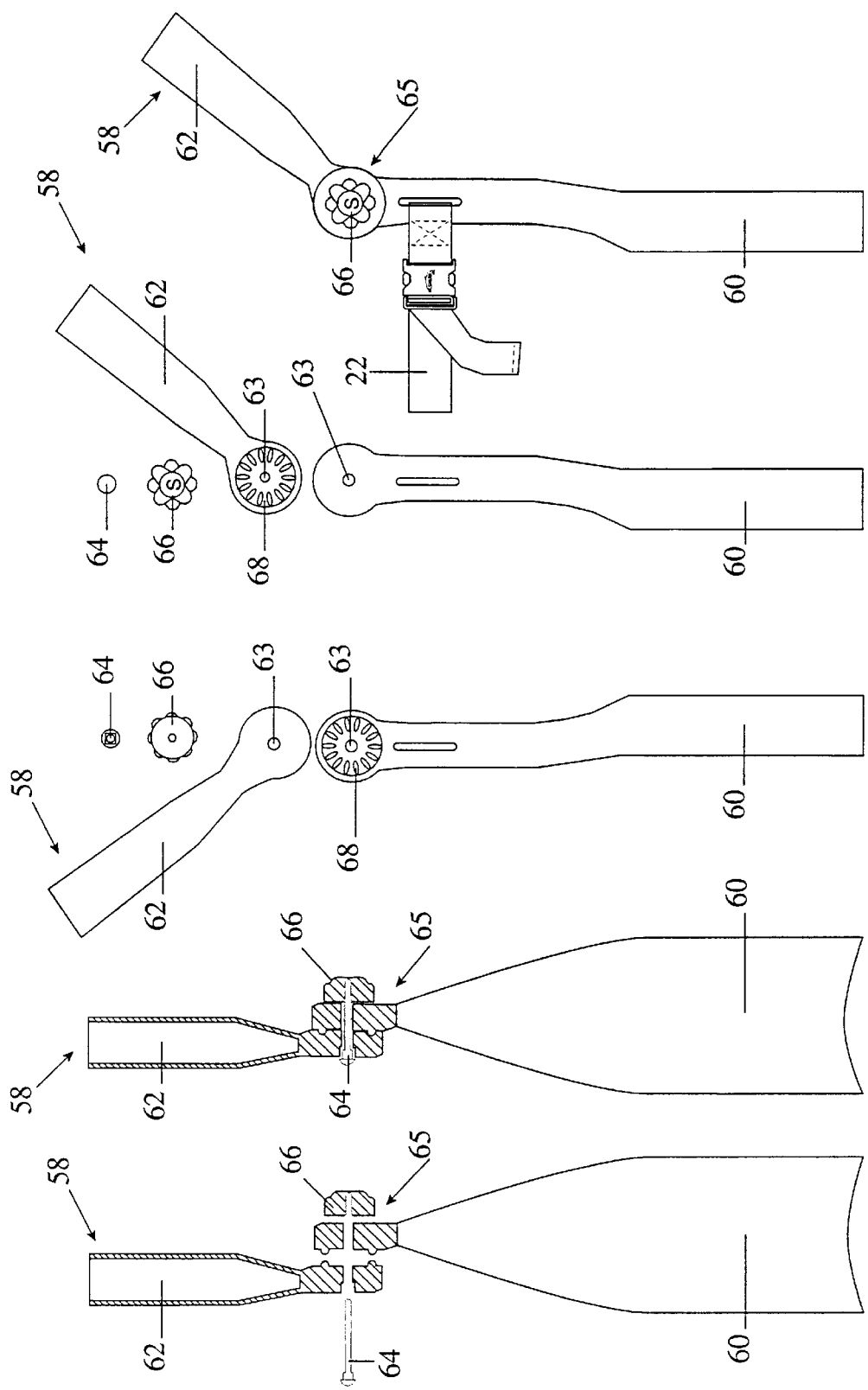

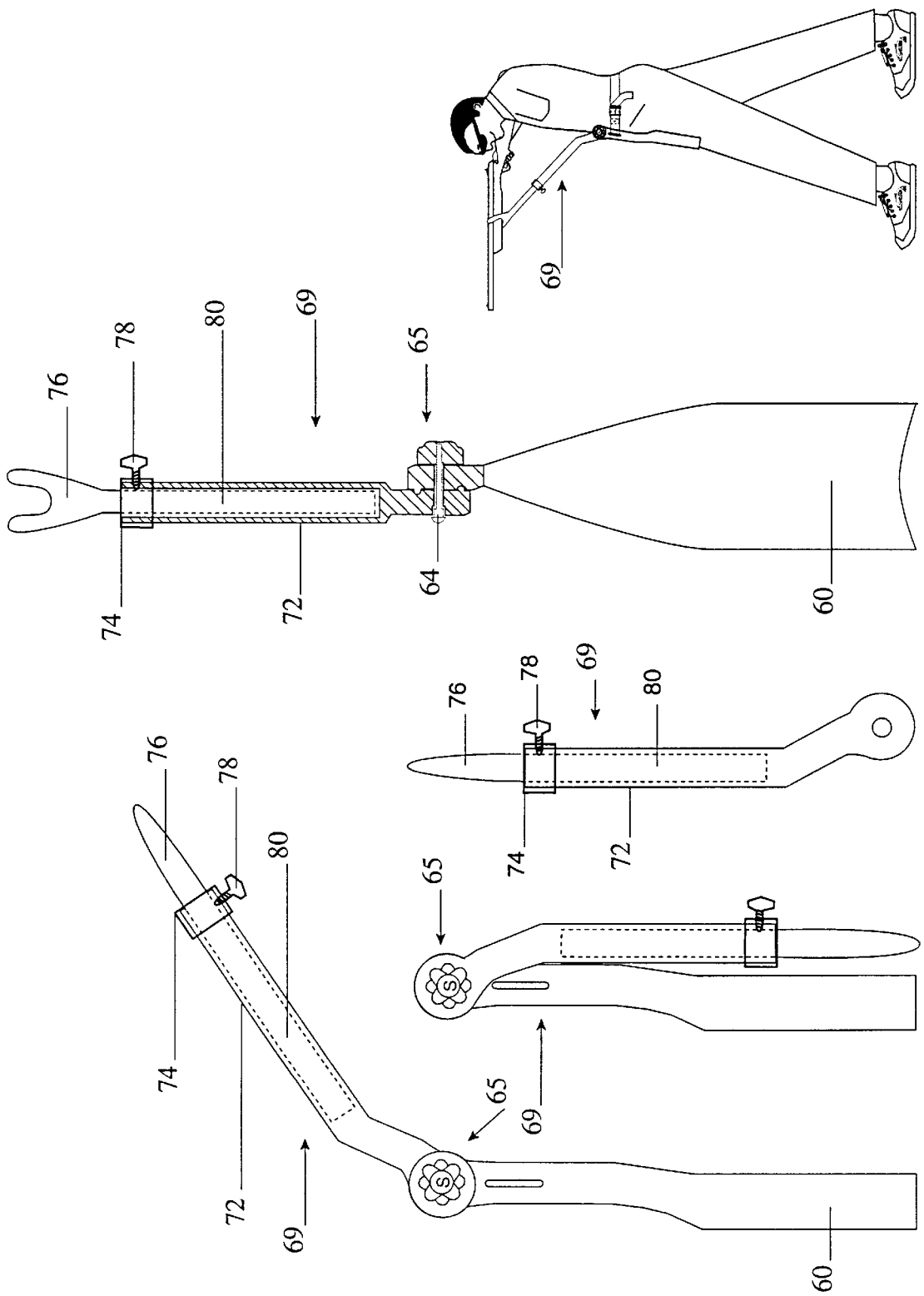

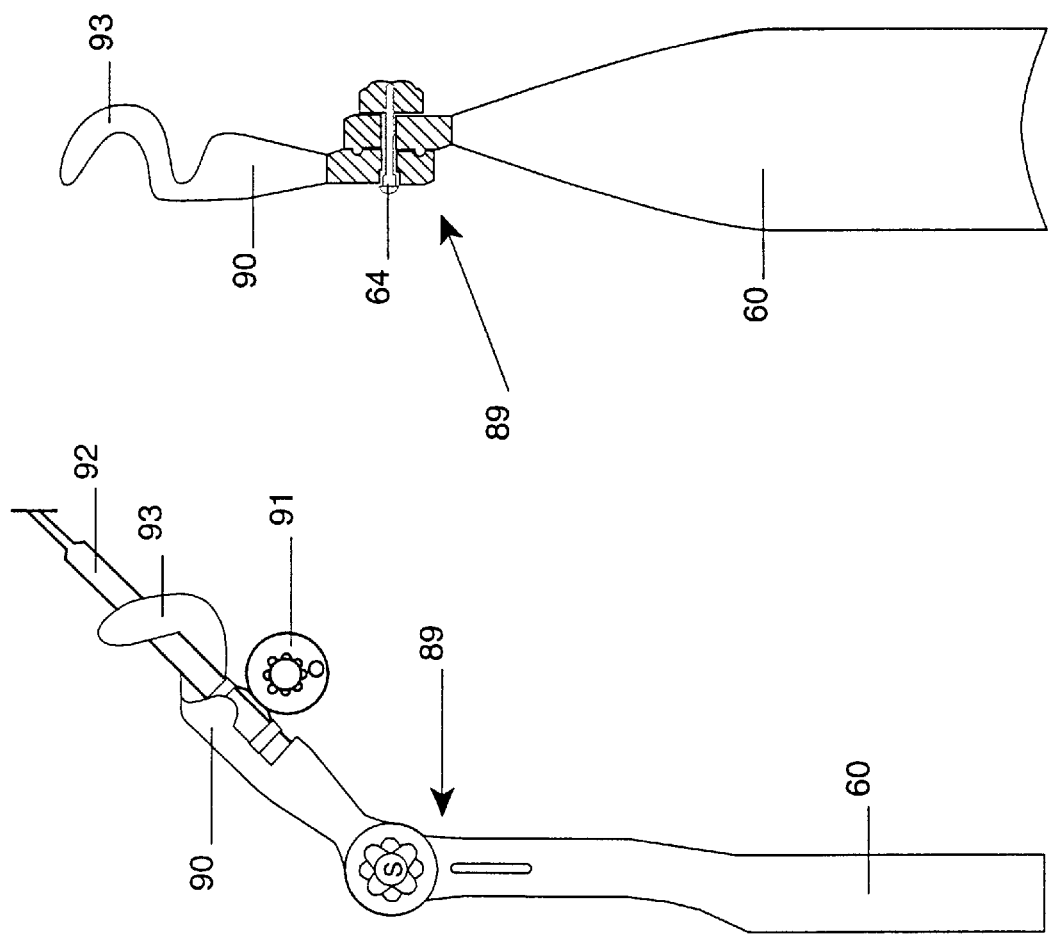
FIG 6C
FIG 6B
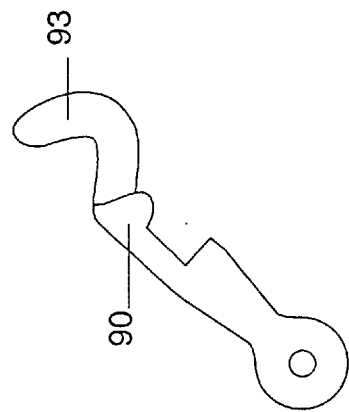
FIG 6A

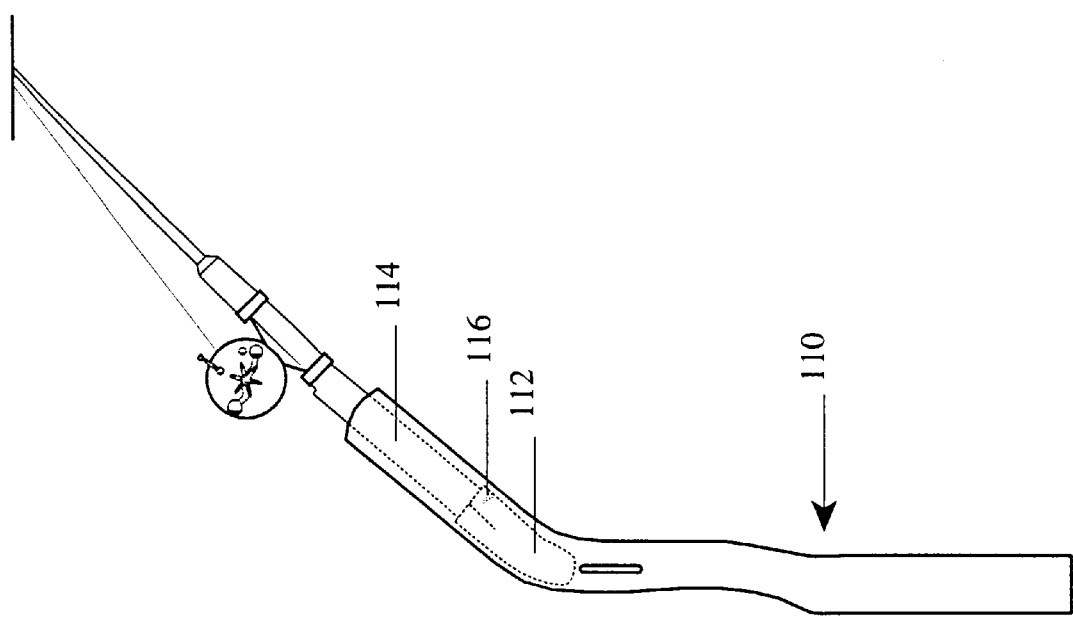
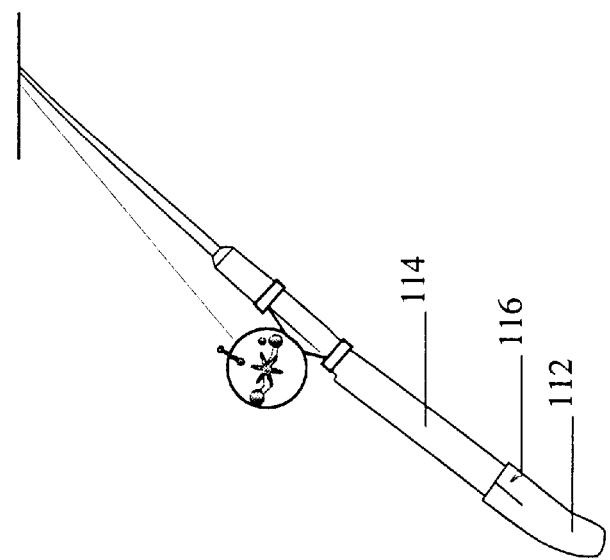
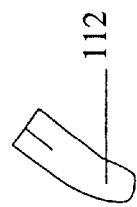
FIG 8C
FIG 8B
FIG 8A

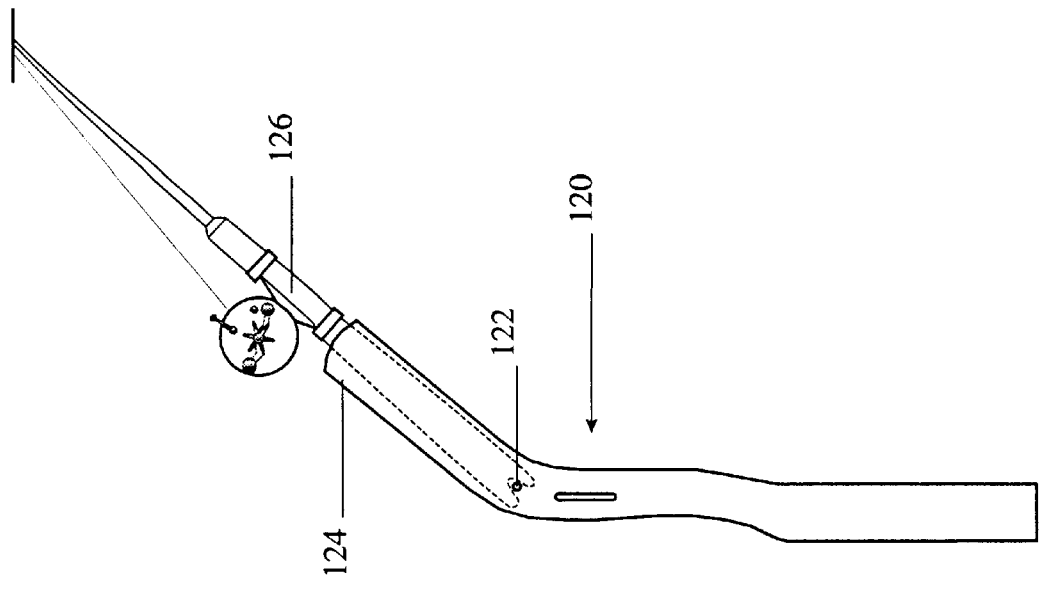
FIG 9D
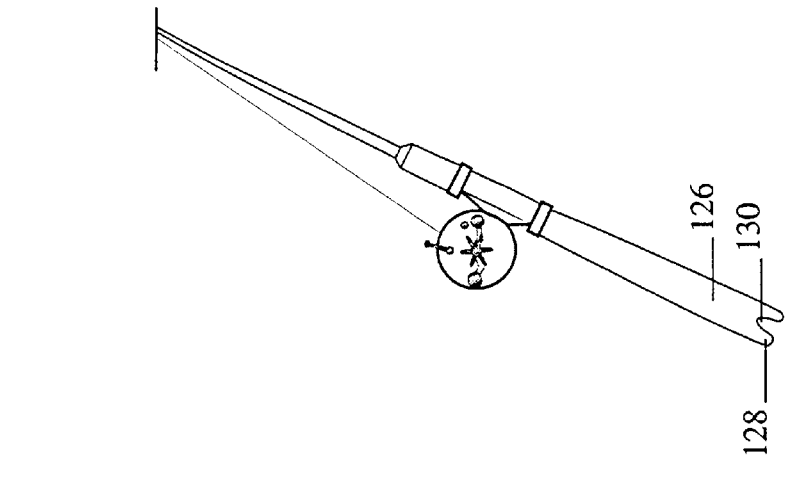
FIG 9C
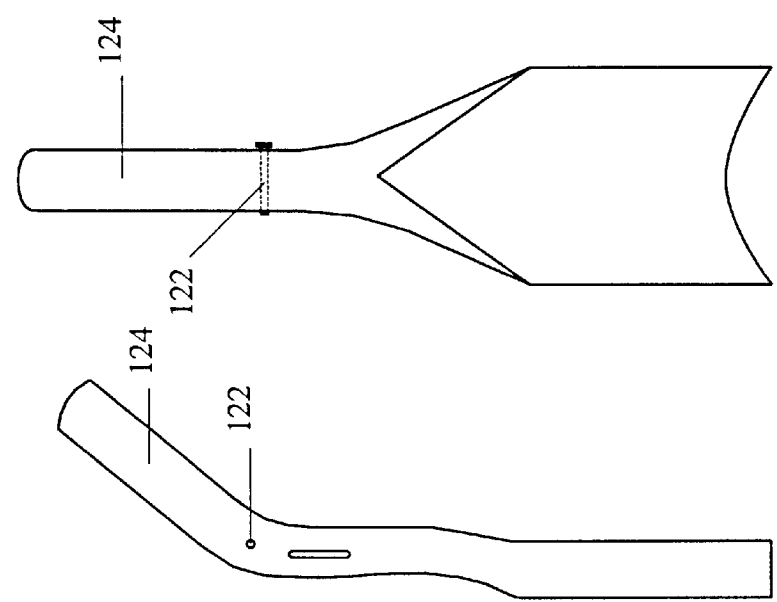
FIG 9B
FIG 9A

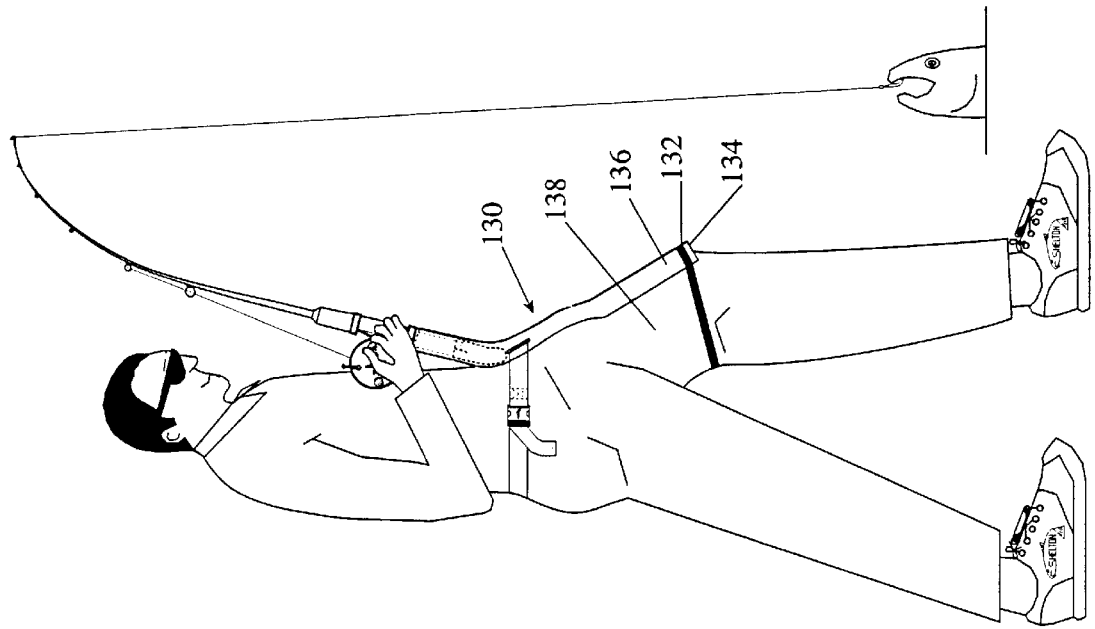
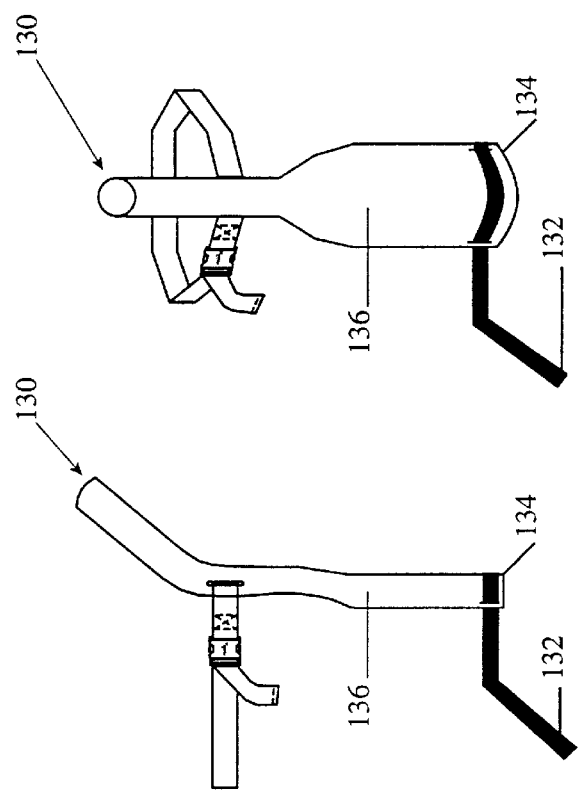
FIG 10C
FIG 10B
FIG 10A

FISHING ROD CONTROLLER

CROSS REFERENCE TO OTHER APPLICATIONS

This application claims the benefit of U.S. provisional application 60/011,245, filed Feb. 6, 1996.

FIELD OF INVENTION

The present invention relates generally to fishing devices. More particularly it relates to a fishing aid for holding and controlling a fishing rod. The present invention also functions as a rod controller for the physically challenged.

BACKGROUND OF THE INVENTION

The concept of fishing goes back before the beginning of recorded history, and man has continued to fish to provide food to eat and, today, as a recreational sport. As time has past, we have developed more and more refined fishing equipment and techniques to attract and catch fish. Some problems, however, have remained unsolved. For example, when fighting a large, strong fish, a fisherman may become worn down and in order to save the rod may have to cut the line, thereby loosing the fish as well as the hook and lure. This occurs because the fish, while trying to swim away from the fisherman, is using its entire body to pull away from the fisherman. On the other hand, the fisherman is balanced on two feet and must resist the pull from the fish by pulling with his or her arms and back. This means that a fish weighing 70 pounds can overpower and beat a fisherman weighing 165 pounds. A fish much smaller can beat those who are out of shape, have back problems or are physically challenged.

Many devices have been developed to hold a fishing rod. The devices are attached to the rail of a fishing boat or driven into the ground. These provide a stable base for boat or shore fishing. However, these devices allow no mobility during fishing. If the fisherman wishes to move, he or she must have someone hold their rod while moving the rod holder or vice versa. Several of these rod holders have bite detection systems. However, no bite detection system can compete with the sensitivity and discerning intellect of a human holding a rod. Nor do these devices aid the fisherman while fighting a fish. When a bite is detected, the fisherman removes the rod from the rod holder and fights the fish in the standard method.

Another set of devices which currently exist are wearable rod holders. These are formed of a cup or tube into which a fishing rod may be placed, a back plate to distribute the forces applied by the fishing rod, and some form of attachment. The attachments range from a waist belt to a hook which hooks over the waistband of a user's pants. These devices provide vertical support for the fishing rod while the fisherman is waiting for a bite. While fighting the fish, the user must still user his or her arms and back to fight the fish, and if the rod remains in the holder, the back plate presses into their abdominal and groin areas. These devices do not increase the user's ability to fight a fish, nor remove any strain from the user's arms and back.

Therefore, there is quite clearly a need in the fishing industry for a device which would allow a fisherman to use more of their body weight and other muscles to fight a fish while still allowing mobility and versatility.

SUMMARY OF THE PRESENT INVENTION

In keeping with the foregoing discussion, the objective of the present invention is to provide a rod controlling aid for use with a fishing rod to provide more strength and endurance when fighting a large fish. This is optimally accomplished by taking advantage of the user's own body weight and leg strength instead of relying on the user's weaker arm and back muscles.

Another objective of the present invention is to provide a fishing aid that allows the user to decide whether they wish to use standard methods (arms and back muscles) for fighting a fish, or whether they wish to use their entire body weight and leg muscles.

A further objective of the present invention is to provide a fishing aid that allows the user to strike hard when setting their hook.

Yet another objective of the present invention is to hold the rod at the user's fingertips for easy access when desired or necessary.

Another objective of the present invention is to provide a fishing aid which can hold a fisherman's rod during at any or all times during the process of catching a fish, including baiting a hook, fish biting, fighting a fish, netting a fish, removing a fish from a hook, raising or lowering a downrigger or when trolling. For optimal usage, the device should also hold the rod when sitting, standing, or even wading in a stream.

Another objective of the present invention is to provide a fishing aid which holds a fisherman's rod such that the fisherman is still highly attuned to slight movements of the line that would indicate a nibbling or biting fish.

A further objective of the present invention is to provide a device which is adjustable to allow the user to choose the angle at which the rod holder holds the rod.

Yet another objective of the present invention is to provide a fishing aid that allows the disabled or handicapped to successfully fish on their own. The device increases the fighting power that the fisherman can use to fight a fish and allows those with temporarily or permanently impaired arms to experience the joy and challenge of the sport of fishing.

Another objective of the present invention is to provide an aid for jigging and mooching.

The present invention can also function for a number of other uses, including as a gun rest while shooting or as an emergency tool for paddling, digging, splinting an injured limb, etc.

In keeping with these objectives, the present invention takes the form of a fishing rod controller having four general sections: the leg pad, the curve, the rod holder, and a belt. In one particularly preferred embodiment the rod controller may be made by post-forming a section of extruded, rigid, pipe. In the section of the pipe that forms the leg pad, the pipe is split and spread apart. It is spread far enough to allow the user's leg to rest within the curve. Above the leg pad and just below the curve, is the belt attachment, in this case, the pipe is split on both sides so belting material may be run through the slits. The belt is fit around the user's waist. Above the belt the rod controller curves outward (away from the body of the user). The upwardmost section of the rod controller is the rod holder. This section is a hollow cylindrical section of the pipe which is left unaltered in the basic version of the rod controller. It is within the cavity in this rod holder section that the rod is placed.

A second embodiment of the rod controller has an adjustment mechanism that allows the user to select and hold the angle between the leg pad and the rod holder.

In alternate embodiments, the rod holding section of the rod controller may be modified for whatever use is desired.

For example, a fly fishing rod has the reel located at the base of the rod. This means that the rod base would not fit in the standard rod controller. For this embodiment, the side of the rod holder is slit. In this case, the reel is aligned with the slit in the side of the rod holder and the rod is inserted. There are also embodiments for a fly rod extension and a gun rest extension. These are additions which may be bolted onto the basic rod controller so that the basic model of the rod controller may be used for a multiplicity of purposes.

BRIEF DESCRIPTION OF THE DRAWINGS

FIG. 2A is a right side view of the first embodiment of the rod controller without the waist strap.

FIG. 2B is a right side view of the first embodiment of the rod controller with the waist strap in place.

FIG. 2C is a front view of the first embodiment of the rod controller with the waist strap in place.

FIGS. 4A–E show an adjustable rod controller.

FIGS. 5A–E show an adjustable gun rest controller.

FIGS. 6A–C show an adjustable fly fishing rod controller.

FIGS. 8A–C show a twist-resistant embodiment of the rod controller.

FIGS. 9A–D show a second twist-resistant version of the rod controller.

FIGS. 10A–C show a version of the rod controller especially suited to the handicapped.

DETAILED DESCRIPTION OF THE INVENTION

Figure 1C:
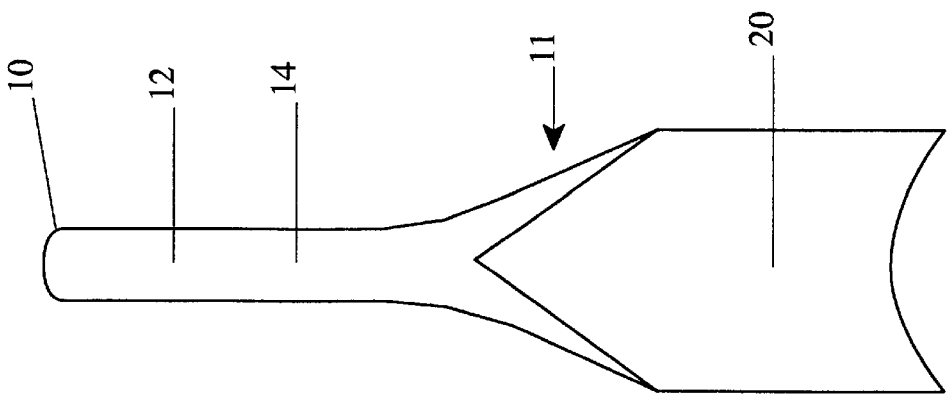
FIG. 1C back view of the first embodiment of the rod controller without the waist strap.
Figure 1B:
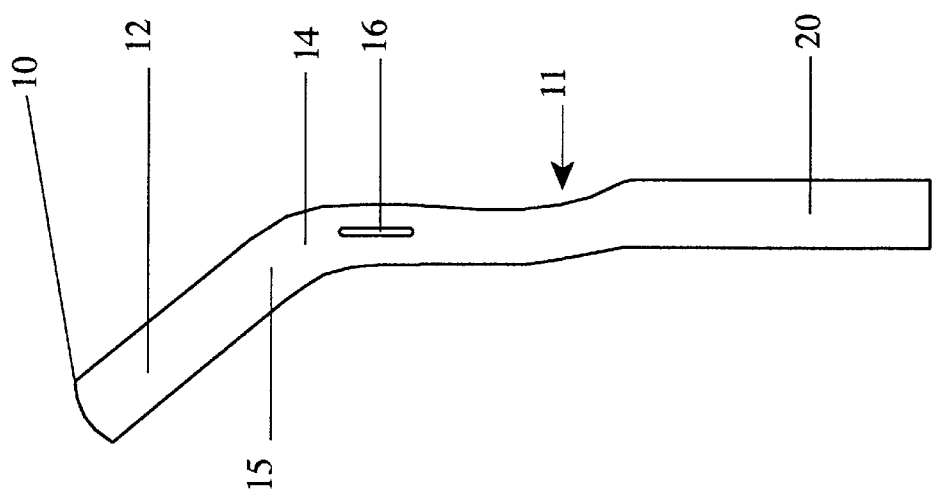
FIG. 1B is a left side view of the first embodiment of the rod controller without the waist strap.
Figure 1A:
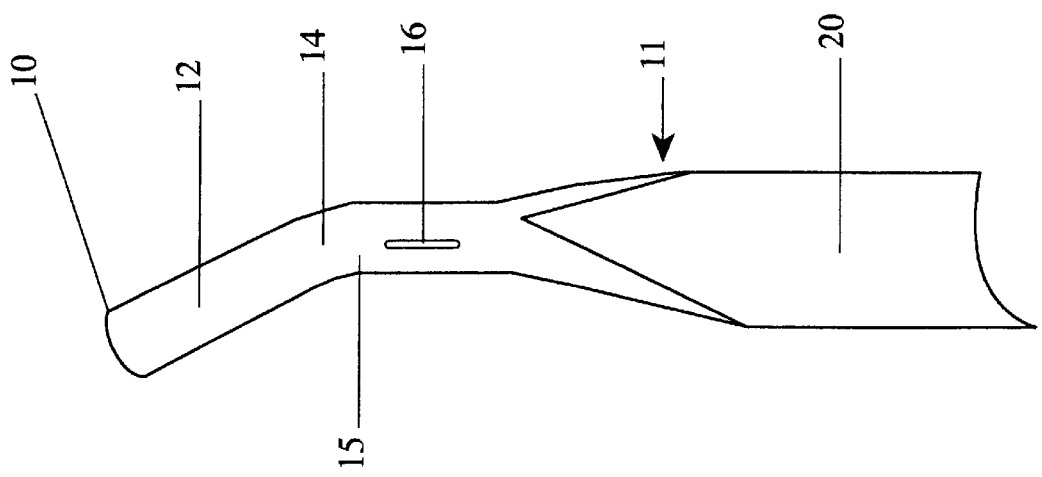
FIG. 1A is a perspective view of the first embodiment of the rod controller without the waist strap.

FIG. 1A is a perspective view, FIG. 1B a left side view, figure 1C a back-side perspective view, and FIG. 2A a right side view of the first embodiment of the rod controller 11 shown without the waist strap 22. FIG. 2B is a right side view, FIG. 2C a front view of the first embodiment of the rod controller 11 with the waist strap 22 in place. This embodiment is preferably used for spinning reel and bait casting fishing rods.

At the base of the rod controller 11 is a leg pad 20 which rests against either leg of a user. Moving upwards from the leg pad 20, the attachment 16 for the belt 22 is found. In this embodiment, the attachment 16 is formed by slits 16 through both sides of the controller 11. Through these two holes 16 a belt 22 is passed. In the preferred embodiment, a nylon mesh band 22 is used, although any other sturdy, flexible material may be used. For maximum performance, a non-elastic material is preferred over an elastic material. The two ends of the belt 22 are attached together with a buckle 24. Preferably, the buckle 24 should be a quickly and easily adjustable. An example of such a configuration has a strap which loops around a bar in the buckle and is turned back on itself. The path of the strap is adjusted such that the strap may be easily pulled to tighten the belt, but the buckle must be rotating or adjust to allow the belt to loosen. Since the belt 22 is what holds the rod controller 11 in place and is the pivot point which creates the lever arm allowing the use of the leg muscles, the attachment 16 of the belt 22 to the rod controller 11 must be made in a sturdy and stable way. Alternate belt 22 configurations include a belt strip 22 which is riveted, bolted, adhered, or otherwise locked into place which respect to the rod controller 11.

Above the belt 22, the rod controller 11 is bent outward (away from the torso of the user). This bend 14 holds the fishing rod at an angle to the body as one would ordinarily hold a fishing rod. This provides a normal feel to the rod orientation and allows for normal baiting, etc. The optimal angle, measured between the leg pad 20 and the rod holder 12, is currently considered 135°. The preferred range of angles is 130–140° but other angles outside this range may be used. The best angle will also vary depending on the user's size and configuration.

The uppermost section of the rod controller 11 forms a holder 12 to hold a fishing rod. As seen in FIGS. 1A–C and 2A–C, the rod holder 12 is connected to the leg pad 20 at the lower end of the base 15. The base 15 being located at the lowermost end of the rod holder 12. In the most basic form, the holder 12 is a hollow tube. In other embodiments the holder 12 may be formed to fit a particular rod or other tool. To use the rod controller 11, the handle of a rod is placed with the hole 10 at the upper end of the holder 12.

The rod controller 11 may be made of any relatively durable material, such as fiberglass, aluminum, conduit, polyvinyl chloride, ABS, and other plastics, thermoplastics and metals, either reinforced or unreinforced. The rod controller 11 may be made by any one of a number of conventional manufacturing processes, including machining, injection molding, blow molding, composite lamination, post-forming an extruded, rigid pipe, etc. The basic rod holder 12 should have an internal diameter of about 1.5 inches in order to fit most fishing rod handles. If the controller is to be used for other purposes, the internal diameter may be altered to accommodate the object to be held. In the post-formed version, the pipe is slit part way up one end and splayed. This forms the leg pad 20. For greater comfort for the wearer, a cushion could be added to the leg pad 20. However, the degree of pliability of the cushion is inversely proportional to the sensitivity effectiveness of the hook setting aspect of the rod controller 11.

Figure 3B:
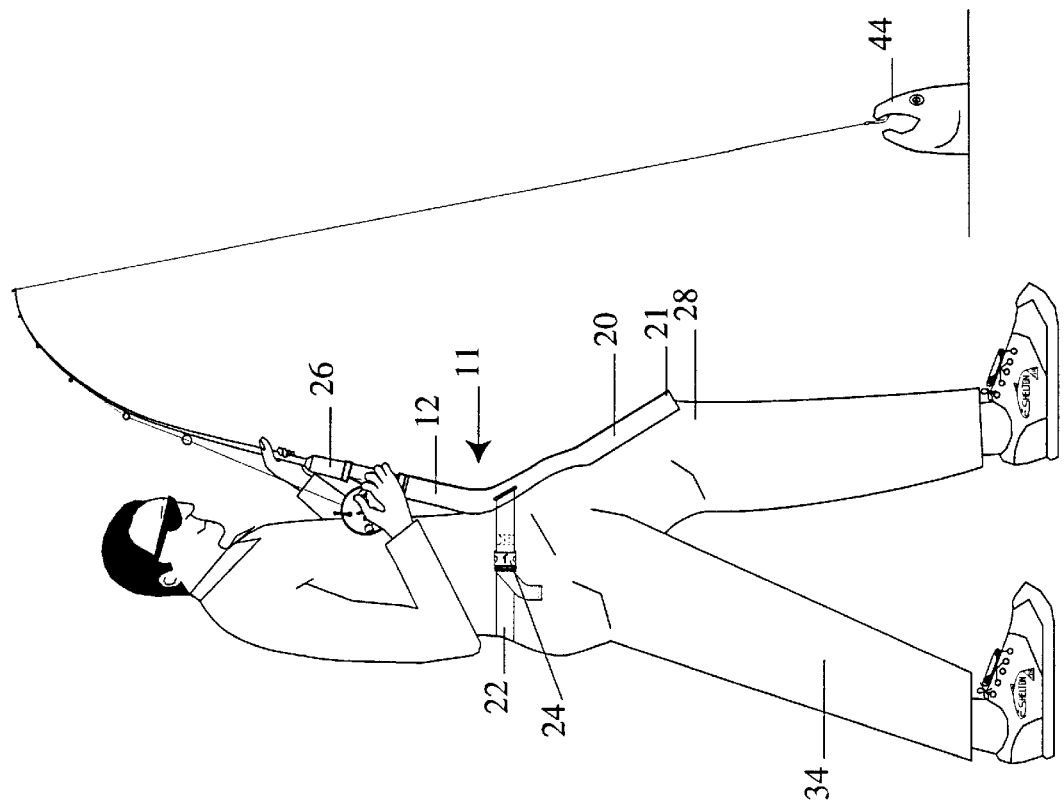
FIG. 3B is a side view of the rod controller being worn by a user while setting the hook after a bite.
Figure 3A:
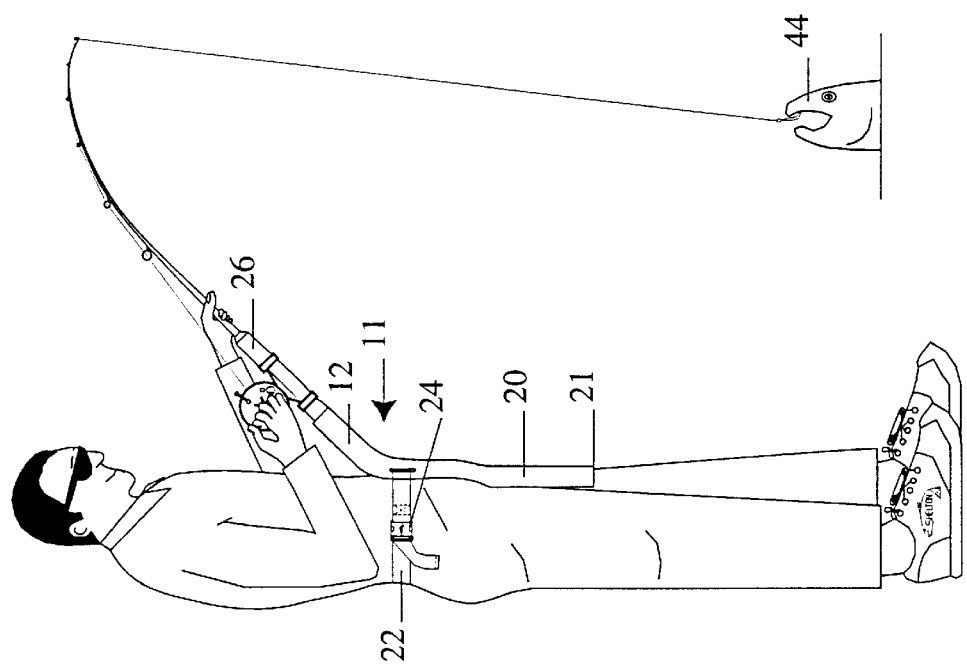
FIG. 3A is a side view of the rod controller being worn by a user while fishing.

FIGS. 3A and B are views of the rod controller 11 in use. The best configuration for wearing the rod controller 11, especially for women, is as follows. The back of the waist belt 22 should be about at the waist line. As the belt 22 comes around the front of the user, it should pass across the hip bone. The rod controller's 11 weight will tend to make the front of the belt 22 into a V. This is the appropriate configuration. This should place the bottom 21 of the leg pad 20 down at the knee of the user, and the thigh of the user should engage the leg pad 20 when the user stands normally. FIG. 3A shows the rod controller 11 being used to hold a rod 26 in place while a fisherman fights his fish in a relatively traditional manner. FIG. 3B shows a fisherman after he has used the rod controller 11 to set the hook in a fish 44. Hook setting is accomplished by one of a couple of methods. First, the user may lift or move forward the leg 28 against which the rod controller 11 is located. He may also step back with his other leg 34 (the leg without the rod controller). Other options will be discussed later.

FIGS. 4A–E relate to an adjustable version of the rod controller 58.

FIG. 4A is an exploded cross-sectional view, FIG. 4B a cross-sectional front view, FIG. 4C an exploded left side view, FIG. 4D an exploded right side view, and FIG. 4E a right side view of an adjustable rod controller 58. In this case, the rod holder 62 and the leg pad 60 are two separate pieces which are attached together with an adjustment device 65. This particular configuration uses a threaded bolt 64 which runs through the bottom of the rod holder 62 and the top of the leg pad 60. Surrounding the holes 63 through which the bolt 64 rests and on the adjacent sides, the top of the leg pad 60 and the base of the rod holder 62 have teeth 68 which interlock. When tightened the nut 66 and bolt 64 hold the teeth 68 together and prevent any rotation between the two sections 62, 60. When the user wishes to change the angle of these pieces 25 62, 60, the user loosens the nut 66 and moves the rod holder 62 and leg pad 60 sections slightly apart so that the teeth 68 no longer engage. At this point, the user can adjust the angle between the two sections 62, 60, then tighten the nut 66 to assure that the teeth 68 re-engage. The angle will then remain constant until the next adjustment.

FIGS. 5A–E relate to a gun rest version of the controller 69. FIG. 5A is a side view of this embodiment of the controller 69. In this case, instead of the rod holder, a gun rest extension 76 is provided. This provides a stable platform on which to mount or rest a firearm. FIG. 5B shows the gun rest controller 69 folded down. This embodiment as well as the other adjustable embodiments may be made such that the user may, in essence, fold the controller 69 in half at the adjustment mechanism 65. This provides a more compact storage configuration. FIG. 5C is a side view of the gun rest extension 76. It is formed from two parts, a holder 72 section and the gun rest extension 76. The holder 72 is a hollow tube with a collar 74. A thumb screw 78 or other locking mechanism penetrates the collar 74 and the holder 72 and bears against the base 80 of the gun rest extension 76 which has been inserted into the holder 72. This allows the user to adjust the height of the gun rest extension 76. This embodiment of the invention may be made in a form which has a number of different holders for different uses. The holders may be exchanged by removing the bolt 64, placing the new holder section, and reinserting the bolt 64. FIG. 5D is a front view of the gun rest embodiment 69. FIG. 5E is a side view of the gun rest embodiment 69 in use.

FIGS. 6A–C are views of an adjustable rod controller 89 for fly fishing rods 92. As the reel 91 on a fly fishing rod 92 is attached at the base of the rod 92, the holder 90 is configured differently. In this case, there is an arm 93 that spirals upward. In order to insert the rod 92, the user inserts and twists the rod 92 until the rod 92 is properly secured within the holder 90. The arm 93 supports the rod 92 while still allowing access to the reel 91. As with the gun rest embodiment 69, the embodiment shown is a replacement piece for the standard rod controller holder 62 section. The bolt 64 is removed and the holder sections exchanged. Other holders could be created for holding, guiding or resting other objects. These holders would then be interchangeable with the other basic holders.

Figure 7C:
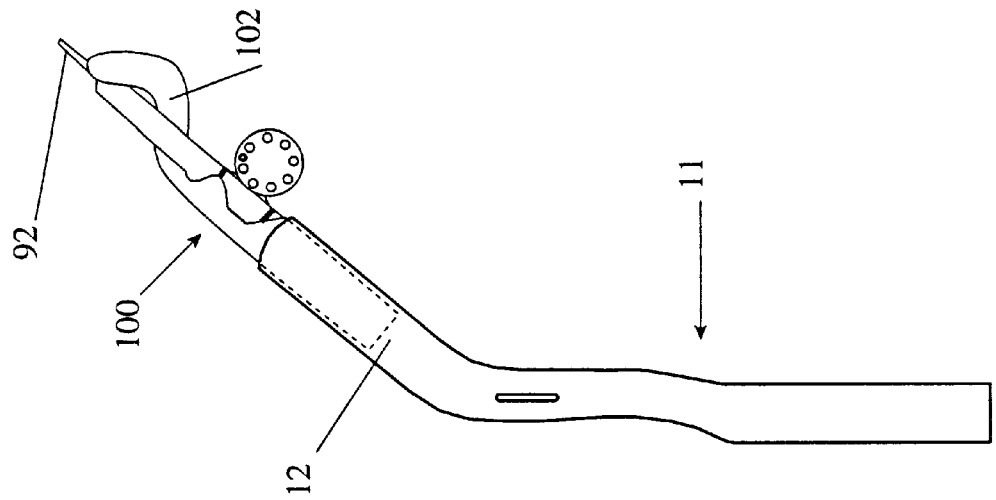
FIGS. 7A–C show a fly fishing rod holder extension.
Figure 7B:
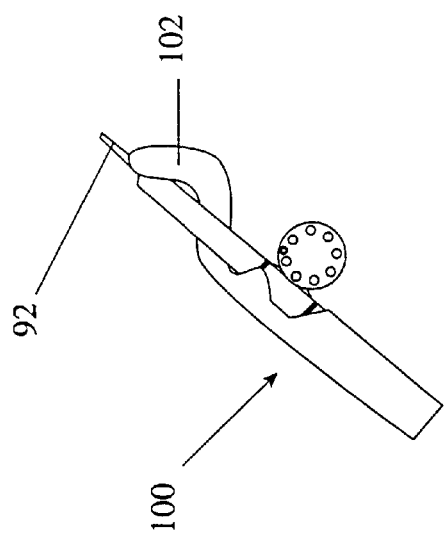
Figure 7A:
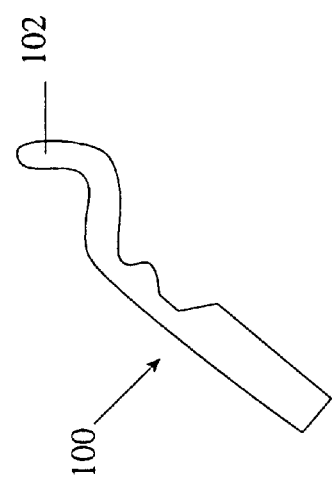

FIGS. 7A–C show an alternate version of the fly rod holder. In this version, an extension member 100 is inserted into the rod holder 12 of the first embodiment rod controller 11. A side view of the extension member 100 is shown in FIG. 7A. In FIG. 7B, a fly fishing rod 92 has been inserted into the fly fishing rod holder extension 100; and FIG. 7C shows the extension 100 with the rod 92 inserted into the rod controller 11. The extension member 100 friction fits, bolts, or otherwise attaches within the holder 12. As with the adjustable version, the rod 92 is held within a spiral arm 102 which provides support for the rod 92. Although only a single configuration has been shown for holding fly fishing rods 92, it is only an example, many other designs would also work. These designs could include: multiple spiral or straight arms; a straight, curved or irregular channel in an otherwise tubular member; a straight arm with a hook and loop fastener (velcro) collar; etc. For the slotted controllers, as the rod 92 is lowered into the fly fishing rod extension 100, the rod 92 is rotated so that the reel remains aligned with the slot. Once in place, the rod 92 cannot be tipped or pulled straight out of the extension. Instead the reverse of the insertion process must be performed; the rod 92 must be rotated as it is withdrawn from the extension.

Many different configurations of extensions may be used with the rod controller. Other versions for specific rods or other uses may also be developed. However, no matter the of the configuration of the upper portion of the extension, the base of the extension must attach or engage the rod holder. The attachment may be bolted to the rod controller, the base of the extension may be shaped similar to a standard rod handle so that it could merely rest in the rod holder, the base could be sized to just fit or friction fit within the channel, or attached by some other temporary means. Alternately, if a controller is to be used specifically with one type or design of rod, the attachment may be attached to the controller by permanent adhesive or other permanent affixing methods. Another optional attachment mechanism is a set of mounts, one fits inside the rod controller and the other on the base of the fishing rod. The mounts are used to provide a more secure fit in cases where it is unacceptable or undesirable for the rod to move within the rod controller. The rod mounted piece is angled such that, when the rod is placed in the rod controller, the rod mounted piece will wedge in-between the controller mounted piece and the opposing wall of the rod controller. This wedges the handle of the fishing rod and prevents extraneous movement of the fishing rod.

FIG. 8A shows a twist resistant version of the rod controller 110. As shown in FIG. 8B, an anti-twist base 112 is attached to the base of a fishing rod 114 by a screw 116 which penetrates the anti-twist base 112 and the fishing rod 114. Other means of attachment, such as friction, adhesive, or other mechanical means, may be used to attach the base 112 to the fishing rod 114. Shown in FIG. 8C, the rod 114 with the base 112 25 attached is inserted into the rod controller 110. When in place, the rod 114 is resistant to twisting because of the curve of the anti-twist base 112. The curve of the base 112 is within the curve of the rod controller 110 which prevents the rod 114 from significant twisting.

FIGS. 9A–D show a second twist resistant embodiment 120. FIG. 9A is a side view and FIG. 9B is a back view of a second anti-twist embodiment 120. In this embodiment, a bolt or rod 122 is secured between or through the sidewalls of the rod controller 124. A modified fishing rod 126, having a specially shaped base 128 surface, shown in FIG. 9C, is used. The base 128 of the rod 126 has an indentation 130 running from side to side. The indentation 130 in the bottom surface 128 of the rod 126, when placed within the rod controller 124, shown in FIG. 9D, will interlock with the bolt 122. As long as the rod 126 remains in place against the bolt 122, the bolt 122 will prevent the rod 126 from turning.

FIGS. 10A–C depict a version of the rod controller 130 for the physically challenged. In this case an additional strap 132 is provided which attaches the base 134 of the leg pad 136 to the user's leg 138. This allows users who have limited physical capabilities to assure that the leg pad 136 remains in place at all times. The strap 132 would have to be detached from the user's leg 138 when the user wished to move the controller 130 to his or her side for sitting or non use.

Optimally, all of the materials used for the rod controller should function equally well when either wet or dry. It is preferred that they be relatively lightweight when wet and dry so that they not add significant weight to the user and are not a significant burden when worn for a long period of time. Finally, it is also preferred that the materials dry relatively quickly so that the rod controller will not mildew, etc. when stored after fishing. Currently preferred are plastics since they do not absorb water; however, other materials may be used.

OPERATIONAL DESCRIPTION

The rod controller uses leg movement, leg muscles, and body weight, as well as the arms and back to fight fish. Effectively, the length of the pole is extended by approximately 2 feet (the length of the rod controller between the base of the fishing rod and the bottom of the leg pad). Once the belt is attached to the user, the rod controller pivots at the belt connection point. This causes the leg pad to act as a lever arm. With this lever arm, the leg muscles easily apply force to the leg pad. The force applied is transmitted up to the handle of the fishing rod, and allows the user to easily and effectively control the fishing rod without using arm and back muscles except for reeling and guidance. Therefore, it allows the user to easily and effectively set a hook in a fish. It holds a rod for a user while lowering a downrigger, sitting, standing, wading, trolling, baiting, striking, fighting, netting, and removing fish. A user's rod is always at his or her fingertips and the fisherman has extreme sensitivity for bite detection even if napping. While sitting, flipping the rod controller sideways holds the rod to a user's side for trolling. The rod controller aids a user with jigging and mooching. It allows a person with the use of only one arm to strike and retrieve fish with standard rod and reels. This means that if a user has a broken or injured hand, arm or shoulder, he or she can still fish. Other uses are as a splint for broken leg or arm, emergency paddle or shovel and as an arm rest while standing.

To pull a fish in, always face in the direction of the fish. If the fish runs sideways around the boat, turn to keep facing the fish and follow. If you have to run after the fish, pull back on the rod with both hands to disengage any contact between your leg and the rod controller, or twist the rod controller so that is lies diagonally across your body and the leg pad extends off to the side, or remove the rod from the rod controller until you are ready to resume fighting the fish.

There are several ways to use the rod controller after you have a bite. The first option is as follows: shift your weight slightly by bending the leg on which the rod controller is mounted. This causes your body weight to do the work of pulling on the fish. Shift your weight back to the other leg as you reel down to take up the line.

Another option is to lift the heel and bend the leg on which you have the rod controller to pull fish in and lower the heel as you reel down to take up line. (This is also the hook setting mode.)

A third option is to do slight knee bends (or squats) to pull in the fish. Then stand upright as you reel in the line.

A further option is to step back with your free foot (the leg that does not have the rod controller) and bend your knee. This rotates the rod and pulls the fish in. Step forward with the same leg as you reel in the line.

Another option is to use the traditional method to fight the fish. You can, at any time, decide not to use the rod controller. To do this you merely remove the fishing rod from the rod controller and fight the fish by whatever means is desired.

The above options are exemplary of the ways a user may use the rod controller. Other variations, or combinations thereof, may also be used.

There are also several modes of operation when not being used or when waiting for a fish to bite. First, a fisherman may turn the rod controller to his or her side. This allows the fisherman to sit, walk or engage in other activities while keeping the rod controller out of the way, but not out of reach. While sitting, the belt is loosened and the leg pad is placed between your legs and the rod controller holds your rod centered in front of you.

While jigging, the user raises and lowers his or her heel of the leg the rod controller is on and holds the line with his or her fingers to help detect a bite. To set a hook, quickly lift the leg the rod controller is on.

While mooching, the rod controller holds the rod for the user, and the user occasionally makes the motions described for jigging above.

While sitting, the user may turn the rod controller to either of the user's sides for trolling. Since the rod controller may be used on either side, both left-handed and right-handed users can use a single rod controller, or a user may wish to alternate.

Although the examples given include many specificities, they are intended as illustrative of only one possible embodiment of the invention. Other embodiments and modifications will, no doubt, occur to those skilled in the art. For example, the present invention can be used with many sorts of hunting or sporting implements such as fishing rods, guns, rifles, other firearms, photographic and video equipment, binocular and sporting scopes, surveying equipment, and other things that need to be held steady. This could also be used as an aid for the handicapped to hold an arm steady while doing something or as an assist for lifting things. Thus, the examples given should only be interpreted as illustrations of some of the preferred embodiments of the invention, and the full scope of the invention should be determined by the appended claims and their legal equivalents.

I claim:

1. A fishing rod controller, comprising:

a holding means for holding a fishing rod, said holding means having a base at a lowermost end of said holding means, a depending leg pad extending downward from a base lower end of said base of said holding means, said depending leg pad extending substantially a length of a user's thigh and being adapted to engage a leg of the user adjacent a knee of the user, said holding means aligned with and extending forward from said depending leg pad, and an attachment means located on said fishing rod controller for attaching said fishing rod controller to said user, said holding means being at an angle with respect to said leg pad, thereby holding said holding means at a angle to the user's body, wherein when said leg of said user is moved forward, said holding means is rotated upward, and when said leg of said user is moved backward, said holding means is rotated downward.

2. The fishing rod controller of claim 1 wherein said holding means comprises a holder and an extension member, said extension member being adapted to be held within said holder and wherein said extension member is adapted to hold an implement chosen from a group of implements consisting of fishing rods, firearms, photographic equipment, video equipment, binoculars, spotting scopes, surveying equipment.

3. The fishing rod controller of claim 1 wherein said holding means comprises a holder and an extension, said extension member having a tubular body having a sidewall, a slot in said sidewall extending downward from an upper end of said extension, said extension being adapted to be held within said holder.

4. The fishing rod controller of claim 3 wherein said extension is configured to retain a fly fishing rod.

5. The fishing rod controller of claim 1 wherein said depending leg pad is rigidly attached to said holding means.

6. The fishing rod controller of claim 1 wherein said depending leg pad is curved to engage the front surface of a leg of said user.

7. The fishing rod controller of claim 1 further comprising an adjustment means for adjusting an angle between said holding means and said depending leg pad.

8. The fishing rod controller of claim 1 wherein said rod holder is rigidly coupled to said leg pad for transferring torque applied on said leg pad to said rod holder to control the fishing rod held therein.

9. The fishing rod controlling device of claim 1 wherein said depending leg pad is formed from a tubular member having a bottom edge and is formed by a slit extending upward from said bottom edge of said leg engaging means, a sidewall of said tubular member being splayed outward.

10. The fishing rod controlling device of claim 1 wherein said holding means is a generally circular channel into which a generally cylindrical member may be placed.

11. The fishing rod controlling device of claim 1 wherein said user attachment means is a belt which is secured around the user's waist.

12. The fishing rod controller of claim 1 wherein said holding means extends upward from said depending leg pad.

13. The fishing rod controller of claim 1 wherein said holding means comprises a tubular member having an axis running along the length thereof, and wherein said axis being generally aligned with an axis running along the length of said depending leg pad.

14. The fishing rod controller of claim 1 wherein said fishing rod controller is worn in front of a user such that the depending leg pad engages the front portion of a thigh of a user.

15. A fishing rod controller, comprising:

a generally cylindrical, hollow tubular member forming a rod holder having a base at a lowermost end thereof, said rod holder configured to hold a fishing rod within said hollow tubular member, a leg pad extending generally downward from a base lower end of said base of said rod holder, said leg pad configured to rest against a leg of a user such that a bottom edge of said leg pad is adjacent a knee of the user and the majority of the leg pad engages a front of a thigh of the user, a waist belt attached to said fishing rod controller, an attachment means for detachably attaching said belt around a waist of the user, an angle between said rod holder and said leg pad, said angle being in the range of 130–140 degrees, thereby holding said rod holder at a angle to the user's body, wherein when the leg of the user is moved forward, said holding means is rotated upward, thereby pulling a tip of the fishing rod upward and when the leg of the user is moved backward, said holding means is rotated downward, thereby moving the tip of the fishing rod downward.

16. The fishing rod controller of claim 15 wherein said angle is approximately 135 degrees.

\* \* \* \* \*